United States Patent [19]

Morrill

[11] 4,155,252
[45] May 22, 1979

[54] WIND ENERGY METERING AND RECORDING SYSTEMS

[76] Inventor: Ralph A. Morrill, 720 SW. 4th St., Ste. 206, P.O. Box 1382, Corvallis, Oreg. 97330

[21] Appl. No.: 868,698

[22] Filed: Jan. 11, 1978

[51] Int. Cl.$^2$ ............................................. G01W 1/02
[52] U.S. Cl. ....................................... 73/189; 364/492
[58] Field of Search ............. 73/189, 170 R; 364/492, 364/506, 510, 511

[56] References Cited

U.S. PATENT DOCUMENTS

| | | | |
|---|---|---|---|
| 3,452,593 | 7/1969 | Lauter, Jr. ....................... | 364/510 X |
| 3,616,692 | 11/1971 | Keller ..................................... | 73/189 |
| 4,052,894 | 10/1977 | Pinnell et al. ......................... | 73/189 |

Primary Examiner—Jerry W. Myracle

[57] ABSTRACT

A system for detecting and metering wind energy and recording the total integrated energy or power levels over any desired period of time. The system emphasizes simplicity of design to achieve: a transducer sensitive to the presence of winds that embodies a means of generating a voltage which is a function of the wind velocity; a means of selecting the minimum wind velocity threshold for the initiation of metering, and rejecting velocities above a selected upper velocity cutoff point; a means of computing which directly converts the wind velocity function voltage to an energy-density analogue voltage which can be programmed to replicate the performance of wind turbines or other wind powered devices and to scale the energy density to the units of energy or power desired; a means of recording which provides a record of the sum-total of the wind energy or power levels measured whose instantaneous values are integrated continuously over a desired period of time and which may be read directly and reset for each period; and an optional means of monitoring and calibration of the system. The recorded data is measured in such values as are directly related to the potential electrical, mechanical or thermal energy that would be generated at the site of installation by any of a variety of typical wind turbine generators.

Because of the system's completeness, simplicity and implementation, may be self powered and accurately computes and records the data in units of wind energy or power; it may be economically produced and employed at much less cost, with better utility and reliability than prior art instruments.

9 Claims, 6 Drawing Figures

WIND ENERGY METERING AND RECORDING SYSTEMS

FIELD OF INVENTION

This invention relates in general to meteorological wind characteristic metering instruments, and more specifically and uniquely to a system for the direct measurement and recording of the wind energy or power levels; which complete system is simply composed, may be self-powered and selectively programed to compute and record data directly in units of energy or power measurement that are easily related to an accurate estimate of the actual potential performance of typical wind turbine generators or other wind power devices to be installed at the site of measurement, to locate the optimal site of installation, or to monitor the operation of such generators or devices after such installation.

BACKGROUND

For well over 300 years meteorological instruments have been used to measure the direction and velocity of the winds. These instruments contributed substantially to the location of sites for the extensive use of mechanical wind power during the early history of mechanized industry, and most particularly in the late 19th Century. With the development of the steam engine, and later electrical power that was readily available in most remote locations of the country, wind power became virtually a lost science.

Only within the past decade has there been a renewed and active interest in using the energy from the winds for the generation of electrical, mechanical and thermal power. Typical wind turbine generators now exist for converting wind energy into each primary power type, but no know prior art system exists that is designed specifically as a complete system for the direct metering and recording of these energy and power functions The power level of the wind is proportional to the density of the air mass times the cube of the wind velocity. Energy is this power function multiplied by the time of production; times the wind cross section are intercepted by, and aerodynamic characteristics of, the turbine blades; times the Betz Law efficiency constant (if applicable); times the total power conversion efficiency of the generator and mechanical linkages. Energy may be measured in equivalent units of kilowatt hours, horsepower hours or British thermal units. Because of recent advances in the related technologies it is now possible to obtain a major percentage of the electrical power required by a household from a properly sited wind turbine electric generator and it is further estimated that by the year 2000 over 10% of the national energy requirement may be derived from the wind by generators located at or near the point of use.

References may be made to meteorological anemometers or other wind direction and velocity meters, of many configurations, which have remained functionally unchanged but continued to be technically advanced by an increasing sophistication of modern technology. They have for example become smaller, more accurate and reliable, and use new electrical and electronic components to generally improve their basic performance but at increasing cost. Computing systems have also been advanced at a remarkable rate so that now a small programable micro-processor that can be held in the palm of the hand will perform complex mathematical computations automatically and will operate for many hours on a small battery. Similarly, sophisticated recording instruments of many kinds have been developed that are small, battery powered, portable and accurate, and can operate in moderately severe field environments for many hours to produce a permanent record of data of all kinds, digital and analogue, including wind characteristic data.

From the need and desire to obtain new measurements and precise data for the computation of wind energy and power potentials of specific sites, each of these independent and readily available devices have been generally contrived into various prior art systems for the metering and continuous recording of wind velocity and direction data, wind "depth" or duration-intensity measurement and to approximately simulate in digital computer circuits the field performance of specific wind turbine electrical generators. However, these prior art systems are typically very expensive, complex, are not self-powered so must have their batteries replaced frequently or are confined in their utility by operating only on commercial or other available electrical power, and are a serious maintenance problem due to poor system reliability and high levels of technical sophistication. Expensive laboratory instruments also are needed to maintain and calibrate these systems. This trend in development has been abetted by the fact that these general purpose devices and instruments are readily available but have not been designed specifically for their final intended end use; i.e. as a simple completely integrated wind energy metering and recording system. The various recorders now in use must also be serviced frequently with replacement components needed to renew their function, may not function in extreme weather conditions; and the data collected is often so frequent and extensive that it must be post-processed on large scale computers which adds appreciably to the expense and technical complexity of such measurements. The technical skill generally required to properly install, operate, maintain and utilize the data from these prior art systems are generally those of highly trained engineers and scientists experienced in electronics, digital data processing and atmospheric sciences. Also, because of their nature and expense, these prior art systems are an attractive object that may be sought out by vandals for pilferage or destruction.

To minimize the equipment complexities and associated technical requirements and costs in prior art systems, compromises have been made in the data quality or frequency of measurement. As a few examples: average hourly to daily wind velocity or integrated wind flow distances or "depth" have been recorded, which are technically and mathematically incorrect for wind energy computations; and the use of continuous on-line instrument computations has been eliminated in favor of complex off-line computer processing of only periodic wind velocities sampled once per hour or more often to obtain the minimal data required to compute an estimate of the wind energy or power functions. These technical expediencies have, in general, resulted in a reduction in the validity, needed precision and accuracy of the data. Even then these systems are still so expensive, complex and require continual maintenance, that only a few of them have ever been employed at any one field site and thus the spatial resolution of the data is also compromised—sometimes to critically much less than is properly required for complete site evaluation by even the most highly skilled engineer or scientist.

Typical prior art wind metering instruments or systems serially measure and record all of the wind characteristic data and do not have a provision for the selection of a low-velocity threshold of measurement, so as to confine their initial point of operation only to the higher "energy winds" of 10-25 miles per hour (mph) velocity, and wind turbine maximum "cut-off" velocities have not been implemented. Mose wind turbine generators do not function efficiently below 10 mph or above 25-30 mph wind velocities, they begin to feather their turbine blades at design velocities and cut-off completely at or below 40 mph. Therefore, metering and recording of these lower or higher wind velocities serves little or no purpose beyond determining the maximum design loads on the blades and supporting structures, which are normally over designed by a large factor for extreme conditions anywhere in the world. Wind direction metering also has little utility since all known wind turbines automatically slew to face the wind, or are insensitive to wind direction as in the case of vertical axis turbines. Consequently, these prior art meteorological wind characteristic metering systems are not efficient in the selection of the kinds and amount of data that they collect and record to only that which is actually needed.

It is also a common prior art practice to utilize the U.S. Weather Bureau or National Weather Service data recorded as peak and average wind velocity values at a few fixed locations throughout the country, to extrapolate an estimate of wind velocities expected at a desired specific site. This data is sufficient for meteorological prediction purposes of the Service but recent experimentation in site evaluation has determined that there is virtually no valid correlation between these extrapolated estimates and the results obtained by actual on-site measurement of the wind velocities. Also, the data can vary by several hundred percent in the average wind speed computations thus obtained due to such wide displacement of the instruments alone, or due to the geographic or topographic differences in adjacent site locations. This has led to expensive errors in the design and the siting of wind turbines which could result in inhibiting the effective use of this important unlimited natural energy resource. Thus, what is now needed are new instruments for the accurate measurement of the wind energy and power production potential at specific sites that are versatile, reliable, inexpensive and can be operated by persons of nominal skill to directly obtain the required data.

THE INVENTION

The general purpose of this invention is to provide a new and unique Wind Energy Metering and Recording System having all of the desired features and capabilities required for the accurate direct measurement and recording of wind energy functions, which system may be self-powered and is a significant improvement upon, and possess all of the advantages and none of the aforesaid described disadvantages and limitations of similarly employed prior art systems and methods. To attain this purpose, the Wind Energy Metering and Recording System embodying this invention includes:

A transducer means of detecting the presence of winds that is sensitive and responsive to the wind velocities over the full range required and which contains an impeller mechanically engaged with or connected to an electrical generator means whose output voltage is an exact consistent function proportional to the velocity of the wind. This transducer means is normally elevated above surrounding wind obstructions and the terrain on an appropriate mast or tall structure and remotely connected by long electrical conductors to the remaining metering and recording elements of the system contained in a suitable weather resistant enclosure or interior space located at a convenient surface point.

Within the aforesaid enclosure and connected to the terminus of the long conductors which convey the wind velocity voltage function from the remote transducer means are a means of sensing the level of this voltage, or consequently the wind velocity, and selecting a threshold of initial operation of the metering and recording functions, this lower threshold being uniquely derived and programed in values which may be adjustable over a wide range from some preset minimum level representing near zero wind velocity up to, and beyond, the onset of the "energy-wind" measurements desired. Similarly an independent means is provided at this point for terminating or limiting the measurements at some preset upper threshold of wind velocity analogous to the "cut-off" velocity of a typical Wind Turbine Generator, or the upper limit of the "energy-wind" measurements desired. By careful selection of thresholds which utilize these two independent means operating together, the energy or power of the winds in any one narrow or wide velocity band may be separately measured from all other wind velocities, and thus, for example, a multiplicity of the metering and recording elements of the system connected to a single transducer means may be used to simultaneously measure an accurate hystogram of the wind velocity or, energy statistical distribution.

A computer means of electronic and electrical character is connected to the threshold means for the conversion of the wind velocity voltage function directly to a velocity-cubed analogue voltage function that is scaled to be directly equivalent to the energy-density of the wind (energy per unit area cross section), and with proportional modification of this analogue voltage by the selection provided by a programing means, does result in a measurement of the actual power levels of the winds. The programing means may also introduce a variety or separate computer functions individually or in combinations that further modify the energy-density analogue voltage function to equal or closely replicate the power conversion efficiencies, Betz Law efficiency limit, mechanical linkage efficiency, turbine area, feathered performance or aerodynamic and other characteristics of an actual known or typical wind turbine generator of electrical, mechanical or thermal power.

A unique recording means is connected to the computing and programing means via a metering function and range selection means, to provide a permanently preserved record of the sum-total of the wind energy of power levels measured, whose instantaneous values are integrated continuously over a desired or convenient period of time, which recording means is a simple device of electrical character that is actuated entirely by its recorded values only and may be reset for each period or may continue to integrate these energy or power measurements for a subsequent period.

A monitoring means may optionally be provided with which means the instantaneous values of wind velocity, wind energy or wind power levels may be displayed and measured in selectable scales and units on the face of a typical display means such as a common moving coil-permanent magnet movement meter or intensity modulated light device. This monitoring means may be portable or co-located with the aforesaid means or may be remotely located and interconnected via long conducters. Similarly a monitoring and calibration means within which an active voltage source is provided that is adjustable and may be selectively introduced at any appropriate point within the system while simultaneously monitoring the descrete system functions, which means would be employed to calibrate the system and assure accuracy of the data, proper operations and the performance of each system function, the adjustment of programing selection or as a means of fault location diagnosis and maintenance.

Therefore, it is an object of the present invention to provide a new, unique and improved Wind Energy Metering and Recording System of the character stated which is intentionally designed for this specific purpose, that may be self-powered and can be adapted to operate unattended and continuously in any remote field location for the accurate measurement of the wind energy or power levels at those sites, which system is simply composed promoting reliability and substantial economy in production and use, is essentially complete and versatile to perform all of the significant measurement functions required and to record the data which are necessary for such specific site evaluations.

It is another object of the present invention to provide a system of the character stated which obtains wind energy and power measurements directly in their specific units of measure which are programed and computed internally in mathematical functions and ranges representative of the actual performance of typical Wind Turbine Generators of electrical, mechanical or thermal power, so as to eliminate the need for off-line processing of wind velocity data in elaborate or computerized mathematical formulations or the use of approximation methods. Thus minimizing the technical skill required to make such accurate measurements, the complexity and chance of error in data processing, eliminating the use of expedient compromises in data collection and inaccurate methods of extrapolation, and maximizing the utility and versatility of the system in a variety of programable and readily implemented configurations that can match the variety of potential field applications.

It is a further object of the present invention to provide a wind energy metering and recording system of the character stated which embodies as the primary source of output data from the system a means of selectively recording the measured data as the sum-total of the wind energy or power levels, the instantaneous values of which are integrated continuously over a convenient or desired period of time, which recording means is reliable, will operate in severe weather conditions, may be easily reset for a subsequent period of time without replacement of components and thus extending its function virtually without limit. Such recording means typically composed of a unique reliable device of electrical characteristic such as a mercury coulometer which is actuated by its measured values only.

It is still another object of the present invention to provide a wind energy metering and recording system of the character stated for which a means is optionally provided for the continuous or periodic monitoring of selected instantaneous values of wind velocity, energy-density, or power levels, and for the periodic calibration, measurement and adjustment of the proper operation of each system function and programing selection, or as a means of fault diagnosis, isolation and maintenance. Such monitoring and calibration means to be self contained, simply and reliably implemented for operation by lay-persons of nominal skills without supplementary instruments for the assurance of data accuracy, proper system operation, reliability and ease of maintenance.

Other objects and features of the present invention will be apprehended from the following description of preferred embodiment taken in conjunction with the annexed drawings.

DESCRIPTION OF PREFERRED EMBODYMENT

Figure 1:
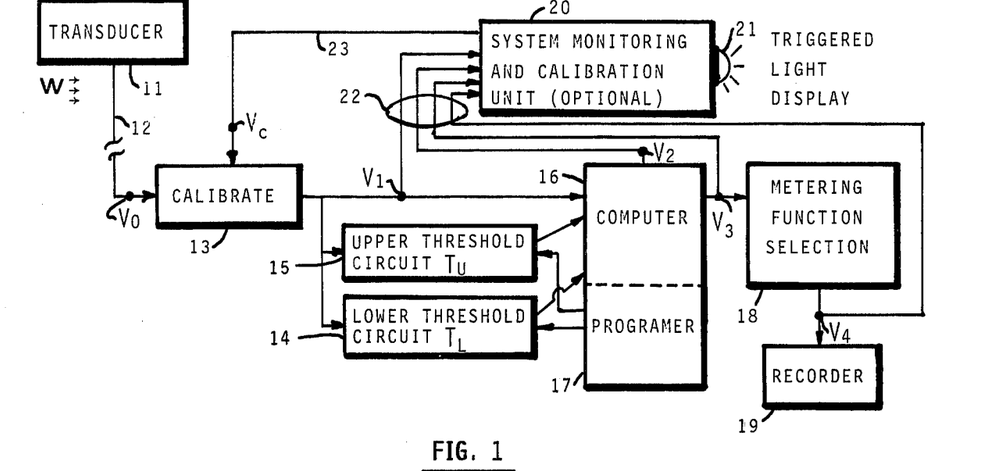
FIG. 1 is a functional block diagram of the Wind Energy Metering and Recording System constructed in accordance with and embodying the present invention, in general.

Referring now by reference and designated characters to the drawings which illustrate the present invention and its prefered embodiment, W generally indicates the presence of winds in FIG. 1 whose energy or power levels are to be measured and recorded by the system diagramatically depicted in this drawing, and which winds W having a long-term statistical velocity characteristic, may momentarily be still, constant, increasing or decreasing in velocity in an irregular random manner. For the purpose of illustration, only in FIG. 2 of this description it may be assumed that this wind velocity is increasing in a linear manner between zero velocity and some higher velocity which is well above the selected operating characteristics of each system function as will be described herein. Be it understood however, that this does not imply or specify a limit in the character of the winds or wind velocity range over which the system may perform its functions or is capable of operating.

The Wind Energy Metering and Recording System generally depicted in the functional block diagram, FIG. 1, is a self-powered analogue configuration which includes: a transducer 11 that detects the presence of and is responsive to the velocity of the wind W to generate a voltage $V_0$ that is a consistent proportional function of wind velocity; a calibration circuit 13 which facilitates the adjustment of system operating values; programable lower and upper threshold circuits 14 and 15 respectively which have threshold control capability that may be set to clip or eliminate the lower and higher levels of wind velocities so as to limit the metering and recording functions of the system to just the "energy winds" or other velocity range desired; a computer 16 and programer 17 which are capable of performing the variety of analogue mathematical functions upon the wind velocity analogue voltage $V_1$ needed to provide direct measures of energy-density, or electrical, mechanical or thermal energy or power levels desired; a metering function selection 18 which scales these energy or power level values to the desired recorded units and ranges; a recorder 19 which produces a permanent record of the selected instantaneous energy or power levels integrated continuously over a convenient period of time; and an optional system monitor and calibration unit 20 for the continual measurement of instantaneous wind velocity, energy-density or power values, the assurance of proper system adjustments and operation and the periodic calibration of the system. In the preferred self-powered embodiment of the system to be described this logical order of arrangement is considered the least complex to implement and is thus presented for illustration purposes only and is not intended to limit the possible alternate arrangements of these components solely to this configuration. For example of several of the circuits, the threshold circuits 14 and 15, could be designed to follow the computer 16 or the metering function selection 18 if desired in any alternative circuit configuration.

Figure 2:
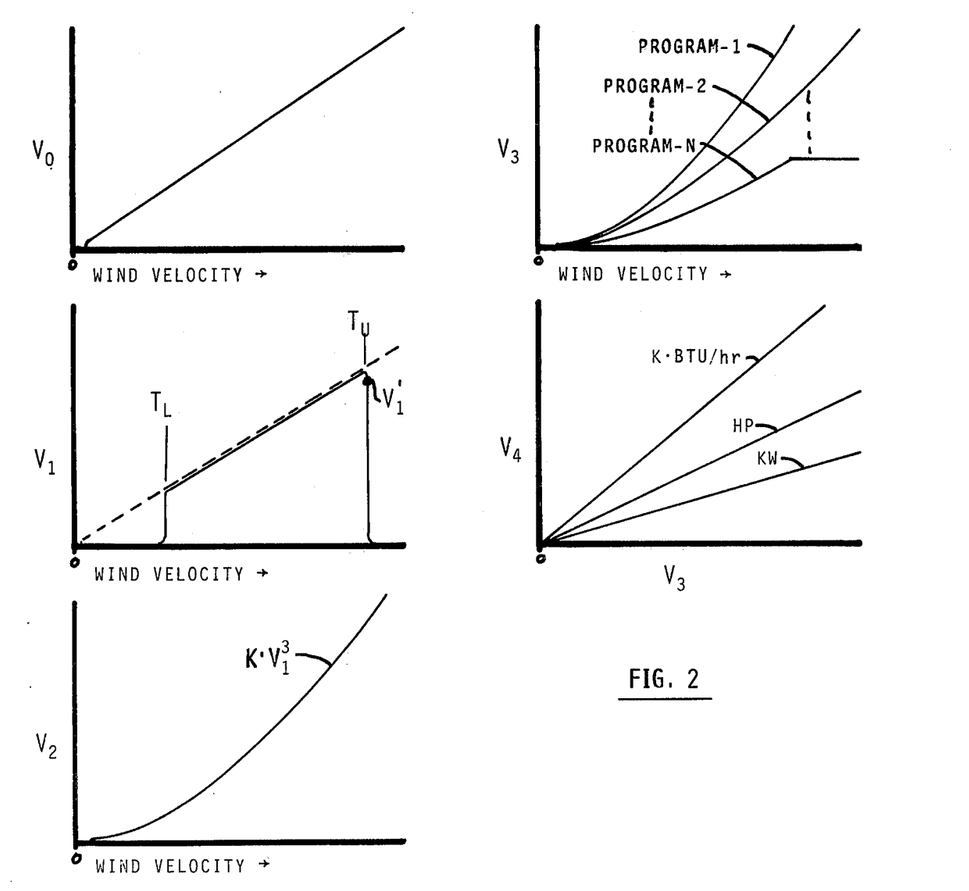
FIG. 2 is a Voltage Form Diagram showing graphically the progression of analogue voltage functions at each major point through the System.

The progression of typical analogue voltage functions at each major point through the system is illustrated in FIG. 2. Here if the velocity of the wind W is linearly increasing the wind velocity analog voltage $V_1$ would follow in typically a linear manner. The clipping of the lower and higher velocity winds in the lower and upper threshold circuits 14, 15 is illustrated in $V_1'$. The wind energy-density analogue voltage $V_2$ is the output of an operational amplifier embodied in the computer 16 and is a function of the cube of the wind velocity analog voltage $V_1$ or $V_1'$. The programer 17 further modifies the energy-density voltage $V_2$ to provide a variety of computer 16 output levels that are programmed to a specific wind energy-density or power function $V_3$ analogous to the performance of an actual wind turbine generator or other such wind energy devices as may be desired to be recorded. The analog voltage $V_4$ is the recorded wind power values for input to the recorder 19 by the metering function selection 18 which may be adjusted to a function of $V_3$ needed to obtain the desired specific units of electrical, mechanical or thermal power and ranges of scale. These system elements and voltage forms will be further explained in the following detailed description of the system.

Continuing in reference to FIG. 1 and FIG. 2, the transducer 11 embodies two elements; an impeller which is sensitive to the presence of the wind and responsive to the wind velocities from any direction over the full range required and which is mechanically engaged with or connected to an electrical generator whose output voltage $V_0$ is an exact consistent function of the velocity of the wind. The impeller may be of any common configuration that satisfies this requirement such as a three-cup anemometer impeller, multiple-blade propeller, Savonious, Darrieus, squirrel-cage, or other type which is very light weight so as to accurately track the wind velocity and to minimize its inertial lag to rapidly changing wind velocities. The impeller must be of sufficient size and shape to impart enough rotational force on the generator to easily overcome bearing friction or magnetic field forces so as to initiate rotation at approximately near zero wind velocity. Ideally, the generator may be a permanent magnet electromagnetic or self-excited direct current rotational type of minimum rotor mass whose output voltage $V_0$ would be linierly proportional to the rate of rotation, although any consistent nonlinierity in $V_0$ such as square-law or cube-law voltage generation may be equally accommodated in the embodyment of the system. Also it is apparent that several transducer means of other configurations could be used, such as an alternating current generator whose rectified output is a voltage proportional to the wind velocity or a cylindrical paddle or other wind-vane mechanically linked in an appropriate manner so as to impart pressure upon a piezoelectric crystal generator in such a way that the output voltage would be a consistent function of the amount of pressure applied, thus proportional to the wind velocity and independent of the wind direction.

The aforesaid Transducer 11 would normally be remotely located at the top of a suitable mast or tall structure that elevates it high above the turbulent air flow caused by the surrounding obstructions or the terrain. Long conductors 12 convey the wind velocity proportional output voltage $V_0$ from the transducer 11 to a point conveniently located at or near the surface and thence into a suitable weather resistant enclosure or container housing the remaining metering and recording elements of the system. The terminus of these conductors 12 are connected to a calibration circuit 13 where the voltage loss due to the length of the conductors is corrected for by an adjustable resistance and a switch is provided to select as input to the metering and recording elements of the system either the wind velocity proportional voltage $V_o$ from the transducer 11 or the calibration voltage $V_c$ from the monitoring and calibration unit 20 via conductor 23. The output of the calibration circuit $V_1$ may be directly connected to the lower and upper threshold circuits 14,15 respectively.

Figure 3:
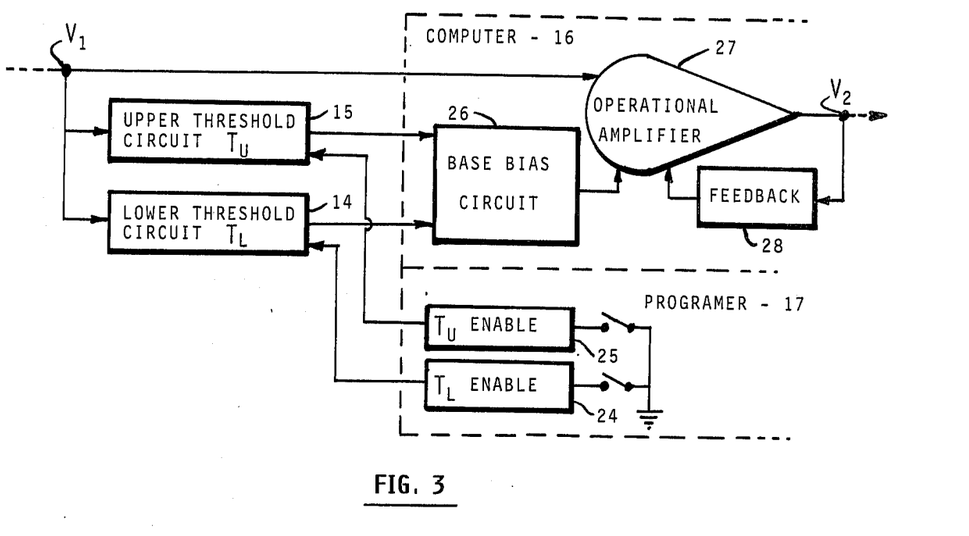
FIG. 3 is the functional block diagram showing the Upper and Lower Threshold Circuits.

Referring now to FIG. 3, the lower and upper threshold circuits 14,15 respectively may be implemented in conjunction with the base bias circuit 26 of the solid state operational amplifier 27 of the computer 16. The lower threshold indicated $T_L$ sets the initial bias point of conductance of the operational amplifier 27 whose output voltage $V_2$ may be adjusted as desired to initiate ON as the velocity analog function $V_1$ increases up to a voltage proportional to a low wind velocity threshold preset at one point typically in the range between 10 to 20 miles per hour. The threshold control for the lower threshold circuit 14 may be simply composed of a preset adjustable voltage divider that can be enabled by the $T_L$ enable 24 program and thus programed into or out of the base bias circuit 26 of the operational amplifier 27 as desired by the programer 17. When $T_L$ is not enabled, or is thus programed out of the base bias circuit 26, the normal base bias point of the operational amplifier 27 is set for conductance at the near-zero wind velocity voltage level of $V_1$.

The upper threshold indicated $T_u$ is normally preadjusted in the upper threshold circuit 15 and selected by a $T_u$ enabled 25 program in the programer 17 to turn OFF the operational amplifier 27 output $V_2$ at a specific wind velocity analog voltage $V_1$ proportional to an upper wind velocity corresponding with "cut-off" of a turbine which may be preset at some point typically in the range between 20 to 45 mph. Thus the upper threshold $T_u$ control function may be derived from any appropriate sharp cutoff solid state switching device in the upper threshold circuit 15 such as high quality switching transistor, silicon control rectifier, unijunction transistor, or the like which is adjusted to switch on at the preset value of $V_1$ corresponding with the desired upper threshold value $T_u$ and thus inter-connect the base bias circuit 26 of the operational amplifier 27 to a voltage divider set to apply a base bias voltage below its conductance cutoff. As $V_1$ then decreases with decreasing wind velocity to a value slightly below or equal to the selected upper threshold $T_u$ this upper threshold circuit 15 ceases to thus function removing the cutoff bias and the operational amplified 27 of the computer 16 is restored to normal operation, as will be described subsequently. When the threshold $T_u$ is not enabled, or thus programed out of the base bias circuit 26 of the operational amplifier 27, it is nonfunctional.

Before proceeding, it is appropriate at this point to clearly specify that the metering and recording elements of this preferred embodyment of the system do not perform their functions directly upon the power generated by the transducer 11 as is typically done in prior art systems, but rather upon an analogue voltage $V_o$ produced by the transducer which is then calibrated to be a consistent velocity voltage function $V_1$ proportional to, and mathematically representative of, the actual instantaneous wind velocity. Thus, in the true sense the computer 16, the programer 17, the metering function selection 18, and recorder 19, are all operating typically as mathematical analogue computer elements in this preferred embodyment of the system. It is generally well understood however, that these analogue computing elements, and the transducer 11 also could easily be duplicated functionally by conventional integrated battery powered analogue circuits or by digital devices and micro-processor computer circuits, individually or collectively, although the possibility of doing so in a simple, reliable, low cost analogue or digital system does not appear feasible at the present state-of-the-art. The general nature of the invention described herein does not however, preclude this as an alternative digital video, digital computer or analogue embodyment of the System or its elements, although they may not expressly be described in detail within the preferred self-powered analog system embodiment.

Figure 4:
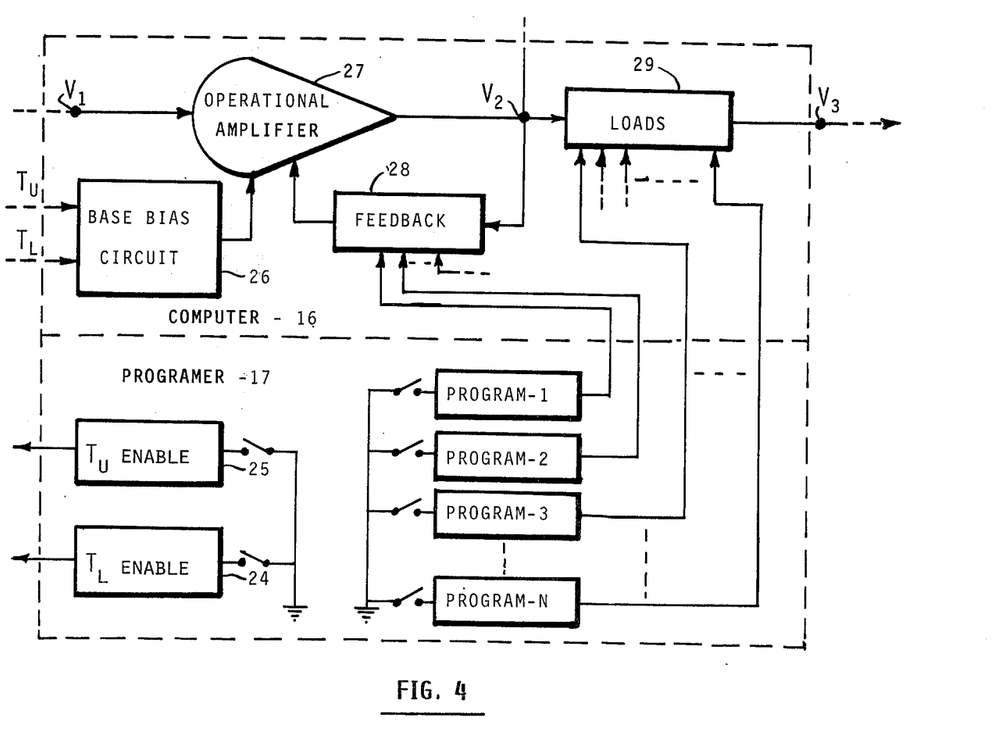
FIG. 4 is a functional block diagram showing the Computer and Programer functions of the System.

To continue with the description in reference to FIG. 4, the computer 16 may be composed of an operational amplifier 27 as previously discussed and its associated base bias 26, feed back 28 and load 29 circuitry and components which has a cube-law low voltage gain characteristic that converts the wind velocity proportional analog voltage $V_1$ into an energy-density analog voltage $V_2$, proportional to the cube of $V_1$. The implementation of the computer's operational amplifier 27 may readily be achieved by utilizing the typical low voltage non-linear transconductance characteristic of any appropriate solid state device such as a transistor or monolithic analog or like device, with or without proper feed back 20, or alternatively several biased diodes in equivalent parallel circuit configuration for the shaping of $V_1$ to $V_2$ voltage response function to match a cube-law gain characteristic which may be less than one over the required range of $V_1$ representative of the wind velocities from zero to typically 50 mph or more.

The programer 17 in FIG. 4 is closely associated with the computer's operational amplifier 27 to selectively modify its voltage output $V_2$ characteristic further and to adjust the range of computer output values $V_3$, in such a way as to adapt the computer 16 functions to a variety of desired applications. Several discrete devices such as resistive loads and voltage dividers, zener diode, resistance circuits and other typical analog programing elements similar to that of the aforesaid threshold enabling selections and designated program 1 through program N in FIG. 4, may be switched into the operation of the computer 16 by manipulation of the programer 17 as required, singularly or in combinations to explicitly obtain the desired wind energy or power measurement values or closely replicate the performance characteristics of actual wind turbine generators of electrical, mechanical or thermal power. For example these explicit programs may typically include; a wind mass-density program provided by a resistive voltage divider circuit selected to attenuate the energy-density analogue voltage $V_3$ by say 10% for system operation above 5000 feet altitudes; efficiency programs such as the Betz Law efficiency constant function which may be provided by a resistance load selected to further attenuate $V_3$ by a constant 59.3 percent; several turbine blade area programs may be provided by shunt resistance loads which in effect increases the computer output voltage $V_3$ by a factor proportional to the cross sectional area of wind intercepted by turbine blades of a given diameter; turbine feathering function programs may be provided by zener diode and resistance circuits which level $V_3$ to a constant voltage output for wind velocities above the turbine design velocity which may be initiated in the wind velocity range typically between 15 to 25 mph for most known turbines; and other such programs as may be required for the desired number of discrete explicit functions needed to match the variety of potential system applications.

To achieve further simplicity of design of the computer 16 and programer 17 such linear additive or subtractive programs as the sum of the turbine generator efficiencies, Betz Law and blade area functions, or the feathering velocity functions could be preset in a single program each embodying calibrated variable attenuators or other devices, and with explicit instructions provided to facilitate their proper adjustment. In this case the optional system monitoring and calibration unit 20 could become a mandatory part of the system. Similarly, to achieve further simplicity of design, nonexplicit and adjustable or fixed descrete programs could be used in combinations and permutations to expand the total number of explicit functions obtained without increasing the total number of individual programs.

It is illustrated that a few simple analogue devices and circuits may be combined properly within the analogue computer 16 and introduced by the programer 17 of the prefered embodiment of the system to achieve all the desired operational functions. It is generally understood that other analogue circuits, digital video or the digital micro-processor counter parts or equivalent of these system elements may also possibly be implemented but would not necessarily be self-powered and would tend to be complex computer circuits with rigorous programing disciplines needed to achieve the same number of explicit functions.

Referring back to FIG. 1, the metering function selection 18 provides a means of selecting power units and scalers for input to the recorder 19. Said metering function selection 18 is basically composed of switches and attenuators for the linear mathematical conversion of the energy analog voltage output $V_3$ from the computer 16, to units of direct measurement of electrical, mechanical or thermal energy; i.e. kilowatt hours, horsepower hours or British Thermal Units respectively. Simple resistor networks provide a division of the computer output analog voltage $V_3$ into the linear analogue relationships of these power measures and then to attenuate the values to a voltage $V_4$ corresponding with the operating characteristics of the recorder for the desired full scale reading. The operating characteristics of the recorder must be understood before this can adequately be described.

The recorder 19 of the prefered embodiment of the system is envisioned as a simple, small, reliable and commercially available device which will operate in extreme weather conditions termed a "Mercury Coulometer" (ref. U.S. Pat. No. 3,655,308-Curtis) that is composed of a capillary tube containing mercury and a tiny drop of electrolyte liquid. A DC voltage is introduced across the mercury column within the capillary tube and, as current passes through the mercury and the electrolytic drop, a molecular migration of the mercury from one side of the drop to the other occurs in one direction, dependent upon the direction of current flow. Thus the drop of electrolyte appears to move along the capillary tube at a rate proportional with the current flow. By carefully controlling the chemical composition and size of the electrolytic drop a well calibrated elapsed time, ampere-hour, watt-hour or energy recorder may be simply devised from this device for a given voltage level applied. It would require, for example, a constant 3.2 microamperes current flow for 1000 hours or 32 microamperes for 100 hours to displace the electrolytic drop exactly ½ inch. Thus applying shunting and series resistance to $V_3$ introduced in the metering function selection 18, to properly selected scaler values in a circuit containing or input to this recording device, it may effectively be used to meter and record the scaled analog voltage $V_4$ directly in values of energy or power. The Recorder 19, by the nature of its operation, will functionally integrate these instantaneous values continuously over the desired period of time and record them as fractional inches of migration of the electrolytic drop through the capillary tube. Accurately measuring or observing the position of the electrolyte drop and by sliding a calibrated ruled scale along the capillary tube the recorder 19 may be reset to zero at each reading or may continue for any desired period of time. When the electrolytic drop approaches the far end of the capillary tube it may simply be turned end-for-end and reset to zero to renew the recording function, and this may be done over and over again indefinately. It will be understood that any other recording device or instrument may also be employed for applications in which the advantages of the Mercury Coulometer recorder device are not required.

Although all of the preceeding described elements may constitute a basic wind energy metering and recording system, it is not a complete system meeting all of the objects of invention unless some optional means is also provided for the monitoring and calibration of system performance and adjustments. The system monitor and calibration unit 20, FIG. 1, may be of relatively conventional character and be portable for field use, co-located with the preceeding described system metering and recording elements, or interconnected and remotely located as desired by the user. It may be simply composed embodying typically a common moving coil-permanent magnet movement meter and associated meter scaling resistances and selection switches and connected to the System by multiple conductors 22 to monitor sequentially or continuously on the face of the meter any selected voltage $V_1$, $V_2$, $V_3$ or $V_4$ in units of wind velocity, energy-density or power. This monitoring function may also be used to periodically calibrate the system by applying an adjustable calibration voltage $V_c$, derived from typically a battery or other active voltage source and which $V_c$ is introduced into the calibration circuit 13 of the system, FIG. 1, via conductor 23, while sequentially monitoring the voltage response of each of the elements of the system and adjusting the previously described system calibration, thresholds, programming, metering functions and scaling circuits and selections as may be required. Leaving the monitor selection switch set in only one position, the instantaneous values of wind velocity, energy-density or power measurement selected may be continuously observed or measured on the appropriate meter scale.

A triggered light display 21 may also be implemented in the monitoring function of the system monitoring and calibration unit 20 by installing a circuit similar to the upper threshold $T_u$ control circuit (15) in conjunction with a LED lamp or other illumination source in which the calibration voltage source or battery is alternatively connected to this circuit and a common solid state switching device is employed to trigger this light display device ON at any preset threshold voltage value desired and in which light display the intensity of illumination could visually be approximately proportional to the energy or power levels being monitored. The threshold trigger level for the light display may be selectively determined by a variable trigger level control resistance in the base bias circuit of the solid state switching device such as a switching transistor. This triggered light display 21 would thus indicate to an observer that wind energy or power levels of interest were present and qualitatively of approximately a given level of intensity.

It is also understood that the monitoring meter or triggered light display 21 could be implemented separately as alternative monitoring functions, or to operate separately or simultaneously in the same monitoring function. The calibration of the System could be appreciably simplified when using the triggered light display 21 and may be implemented for example, using a well calibrated threshold setting dial on the light's trigger level control resistance which may be adjusted in conjunction with the application of the calibration voltage $V_c$ to the calibration circuit 13 so as to just trigger the light ON at a predetermined setting of the dial while at the same time the triggered light display 21 is switched sequentially to monitor any one of the voltages, $V_1$, $V_2$, $V_3$, or $V_4$ of the system. It is understood that any common configuration of analogue or digital counterparts for the system monitoring and calibration unit 20 of the character described could also be functionally implemented from conventional meters or by digital volt meter and display devices and their circuitry including associated switches and scaling circuits for selecting and properly displaying the appropriate instantaneous values of wind velocity, energy or power levels which may be monitored, calibrated or adjusted in either digital or analogue system embodiments.

Figure 5:
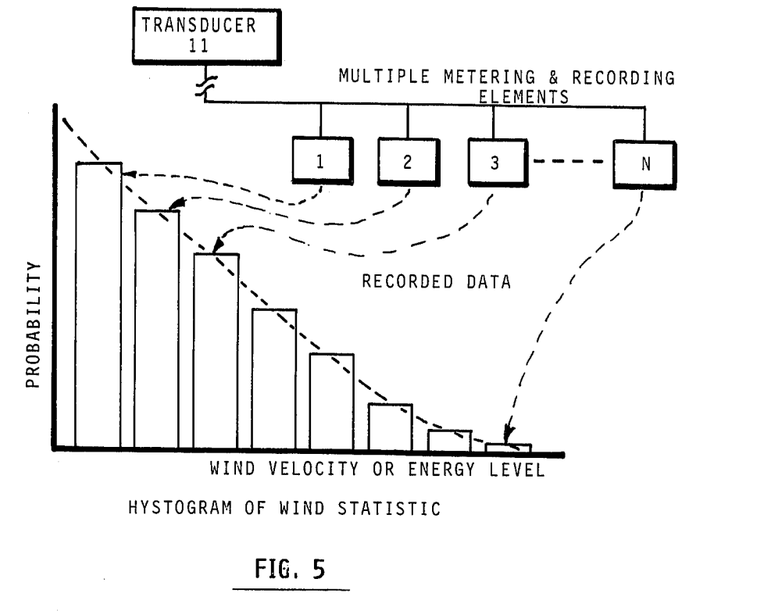
FIG. 5 is an alternative system configuration for the measurement of a hystogram of the wind velocity statistic.
Figure 6:
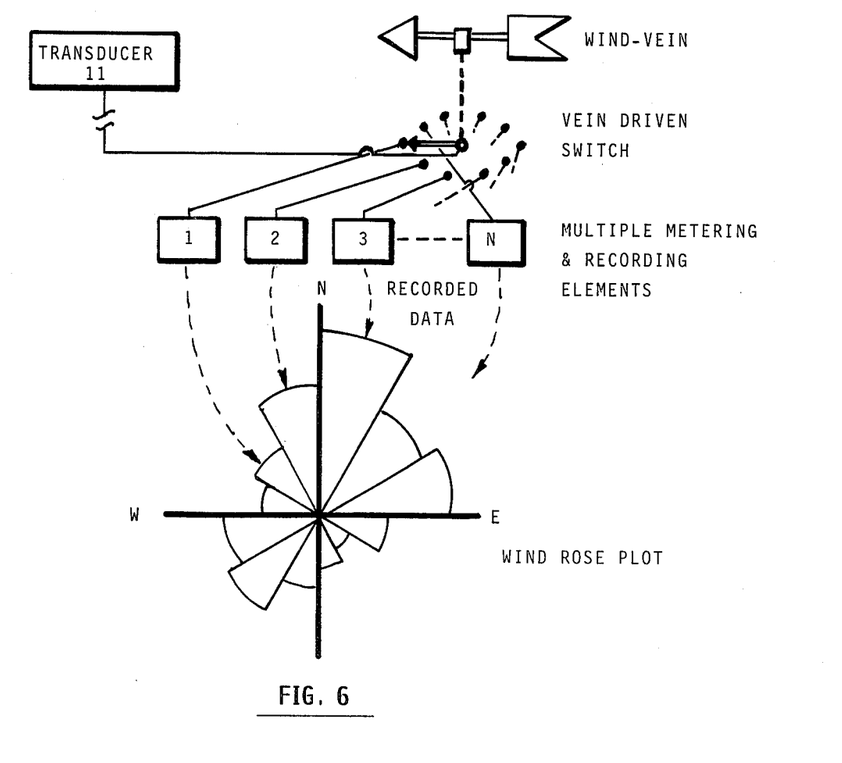
FIG. 6 is an alternative system configuration for the measurement of a wind rose plot of wind direction and velocity levels.

It will be readily apparent to those skilled in the art that many variations upon the configuration described in the foregoing preferred embodiment of the system may be made by changing the arrangement or sequence of system elements, their size, shape, numbers, types, values or kinds of component parts such as the internally powered analogue or digital alternatives given, and that functions could be added, modified or deleted in the implementation of the system without departing from the spirit, scope or intent of this invention. For example: a scientific interest in recording the statistical distribution of the wind velocity function at a given site could be satisfied by a alternative system implementation, FIG. 5, composed of one wind velocity transducer connected simultaneously to a multiplicity of metering and recording elements of the system in which the upper and lower threshold circuits may be preset to narrow contiguous wind velocity bands which did not overlap. As the wind velocity varied in its natural statistical manner over a long period of time, the values of wind energy density $V_2$ levels thus recorded would shift from one metering and recording element to another, and a graphic presentation of the cube-root of these recorded values, times an analog scaling constant, plotted as a function of the sequential velocity bands, would produce an accurate hystogram of the wind velocity statistical distribution. Similarly, by directionally gating a single transducer output sequentially into a multiplicity of identically preset metering and recording elements through an added wind are driven switching circuit, FIG. 6, the equivalent of a "wind rose" could be accurately recorded and graphically derived.

It will thus be understood that the objects of the invention set forth above, among those made apparent from the preceeding descriptions, are each efficiently attained. Since certain variations may be made in the preferred embodyments set forth without departing from the scope and objects of the invention, it is intended that all matter contained in the above descriptions shall be interpreted as illustrative and not in any limiting sense.

Having thus described the System constructed in accordance with and embodying the present invention, what I claim and desire to obtain by Letter of Patent is:

1. A system for directly metering and recording the energy or power potential of the wind comprising:
   a. A tranducer means for detecting the presence of wind and which means is responsive to and accurately tracks the velocity of the wind to generate or otherwise produce a voltage that is a linear function proportional to the wind velocity,
   b. A lower threshold means connected to the transducer means which may be enabled and adjusted as desired to initiate the metering and recording of the wind energy density or power levels to only that above a preset lower velocity limit, or optionally not enabled,
   c. An upper threshold means connected to the transducer means which may be enabled and adjusted as desired to inhibit the metering and recording of the wind energy density or power levels above a preset higher velocity limit, or optionally not enabled,
   d. A computing means connected to the threshold means and transducer means which computes the wind energy-density levels in a velocity-cubed mathematical relationship which means may be programed for a variety of computational functions and is responsive to the threshold means,
   e. A programing means connected to the computing means and the upper and lower threshold means by which the computer may be versatilely programed for numerous computational functions which correct for air mass-density, replicate discrete or combined performance characteristics of wind turbine generators or other wind powered devices with which means the threshold limits are selected and enabled and by which means the energy-density level of the wind may be programed for conversion to specific energy or power values,
   f. A metering function selection means connected to the computing means by which to selectively adjust the values of energy-density, energy or power levels computed to the desired units and scales appropriate to the characteristics of the recording means provided and for the direct recording of mechanical, electrical or thermal power units of measure,
   g. A recording means connected to the metering function selection means composed of a mercury coulometer by which the sum-total of the instantaneous energy or power levels metered may be integrated continuously over a desired period of time which recording means may be easily reset for any subsequent period of time,
   h. A optional system monitoring means connected to appropriate points within the aforesaid system means by which the instantaneous values of wind velocity, energy-density, or power levels may be selected sequentially for display and measurement on the face of a common moving coil-permanent magnet meter,
   i. An optional system calibration means which embodies an adjustable known voltage source that may be introduced at any appropriate point within the aforesaid system means, while simultaneously monitoring other selected points within the system using the preceeding described system monitoring means, so as to calibrate the system to assure proper operation and the accuracy of the data, facilitate adjustment of each system function or programing selection, and as a means of fault location diagnosis and maintenance,
   j. Appropriate power supply means as are necessary for proper system operation.

2. The combination in accordance with claim 1 wherein said system the transducer means includes a permanent magnetic direct current generator which also has a self-excited field coil to produce a square-law or cube-law voltage proportional to the wind velocity or an energy-density function analogue and the computing means is correspondingly a three-halves-law or linear analogue mathematical function respectively which may be programed for a variety of computational functions and is still responsive to the threshold means.

3. The combination in accordance with claim 1 or claim 2 wherein said system is entirely self-powered by the transducer means and operates as an analogue computational system with exception only to the optional system calibration means voltage source.

4. The combination in accordance with claim 1 wherein said system the sub-monitoring means may be provided by an intensity modulated triggered light display or said monitor meter circuitry or both implemented independently in the same monitoring means.

5. The combination in accordance with claim 1 wherein said system may be a digital implementation comprised of:
   a. A transducer means for detecting the presence of wind which is responsive to the wind velocity to produce a pulse signal whose frequency or repetition rate is some accurate multiple of the velocity of the wind.
   b. A digital threshold means connected to the transducer means which embodies a digital counter and coded AND Gate to detect the velocity of the wind and which may be coded and enabled to initiate the metering and recording of wind power levels to only that above a preset lower velocity limit, or optionally not enabled.

c. A digital threshold means connected to the transducer means which embodies a digital counter and coded AND Gate to detect the velocity of the wind and which may be coded and enabled to inhibit the metering and recording of wind power levels above a preset higher velocity limit, or optionally not enabled.

d. A digital computing means comprised of large scale integrated (LSI) micro-processors and read only memories (ROMs) connected to the threshold means and transducer means which means computes energy-density levels in a velocity cubed digital mathematical function, said means may be ROM preprogramed for a variety of additional computational functions and may be inhibited or enabled in response to the aforesaid threshold means coded AND Gate outputs.

e. A programing means connected to the digital computing means and upper and lower threshold means by which the preprogramed ROM of the computing means may be addressed to command the numerous digital computational functions required for system operation and by which means the threshold limits are selected and enabled.

f. A metering function selection means connected to the computing means which embodies a LSI micro-processor and digital-to-analogue (D/A) converter and by which means the computed values of wind energy-density energy or power levels may be converted to digital or analogue voltage units and scales appropriate to the recording means employed.

g. A recording means connected to the metering function selection means which may be a common digital printing recorder, mercury coulometer or both for recording the sum total of, or the instantaneous power levels metered, or for integrating these levels continuously over a desired period of time.

h. Appropriate system monitoring and calibration means composed of digital micro-processors, ROM's, keyboard or switches and a meter movement with D/A converter or LED numerical display or like display means.

i. Appropriate power supply means as are required for the proper operation of the system.

6. The combination in accordance with claim 5 wherein in said system the processing of the transducer means output pulse signal, whose repetition rate or frequency is proportional to some multiple of the velocity of the wind, is manipulated in a digital video threshold and computer means by common astable multivibrators, flip-flop and boot-strap circuits in such a way as to produce the desired system computational functions and results in an output signal whose duty cycle is proportional to the energy-density or power of the wind, which when integrated and filtered may be scaled and recorded as described using the mercury coulometer or other recorder.

7. The system of claim 1 configured for metering and recording the velocity or energy statistics of the wind comprised of at least one transducer means and multiple units of the metering and recording elements of the system connected in parallel and whose threshold means are adjusted to contiguous non-overlapping wind velocity bands to record data, which data may be computationally converted to velocity or measured directly in units of energy-density and graphically plotted as a hystogram of the statistical characteristic of the wind velocity or energy levels.

8. The system of claim 1 configured for metering and recording the long-term directional statistical characteristic of the wind comprised of: a single transducer means, a wind-vane positioned switch which sequentially interconnects the transducer means to any one of a multiplicity of identically programed metering and recording means of the system whose threshold means are not enabled and whose recorder means are set to record energy-density data, directly and which data the wind-vane switches from one metering and recording element to another and thus the recorded data may be plotted directly as a wind energy-density rose to graphically depict the directional intensity statistical characteristics of the winds.

9. The system of claim 1 configured for the three-dimensional metering and recording of wind energy-density comprising: multiple systems cannonically distributed and elevated in uniform three-dimensional spatial relationships with each other and whose metering and recording elements are identically programed with thresholds set and enabled and recording energy-density levels directly and thus will indicate wind flow regimes and concentrations through large or small areas.

* * * * *